(12) United States Patent
Hayashi et al.

(10) Patent No.: US 8,060,899 B2
(45) Date of Patent: Nov. 15, 2011

(54) DISK DEVICE

(75) Inventors: Ryuuji Hayashi, Osaka (JP); Katsuo Ichinohe, Osaka (JP); Makoto Masui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 451 days.

(21) Appl. No.: 12/401,854

(22) Filed: Mar. 11, 2009

(65) Prior Publication Data

US 2009/0235293 A1    Sep. 17, 2009

(30) Foreign Application Priority Data

Mar. 11, 2008 (JP) ................. 2008-060693

(51) Int. Cl.
*G11B 7/00* (2006.01)
(52) U.S. Cl. .......................... 720/691; G9B/7
(58) Field of Classification Search ............ 720/691
See application file for complete search history.

(56) References Cited

U.S. PATENT DOCUMENTS

| 5,317,464 | A | 5/1994 | Witt et al. |
| 2002/0009036 | A1 | 1/2002 | Omori |
| 2003/0142611 | A1 | 7/2003 | Kume |
| 2007/0162919 | A1 | 7/2007 | Omori et al. |
| 2009/0083771 | A1* | 3/2009 | Yokochi et al. ............... 720/604 |

FOREIGN PATENT DOCUMENTS

| JP | 2005-190554 A | 7/2005 |
| JP | 2007-172787 A | 7/2007 |
| WO | WO-03/085662 A1 | 10/2003 |
| WO | WO-2006/022216 A1 | 3/2006 |

* cited by examiner

*Primary Examiner* — Hoai V Ho
(74) *Attorney, Agent, or Firm* — Global IP Counselors

(57) ABSTRACT

A disk device includes a loader chassis, a traverse chassis, an optical pickup, a clamp mechanism and a cam mechanism. The cam mechanism pivots the traverse chassis with respect to the loader chassis between a loading position and an unloading position. The cam mechanism includes a follower, a cam plate, a guide member and a biasing member. The cam plate has a first restricting face that restricts a first direction movement of the follower with respect to the cam plate. The guide member has a second restricting face that restricts a second direction movement of the follower with respect to the guide member. The biasing member biases the follower towards both the first restricting face of the cam plate and the second restricting face of the guide member when the traverse chassis is located at the loading position.

13 Claims, 3 Drawing Sheets

DISK DEVICE

CROSS-REFERENCE TO RELATED APPLICATIONS

This application claims priority to Japanese Patent Application No. 2008-060693 filed on Mar. 11, 2008. The entire disclosure of Japanese Patent Application No. 2008-060693 is hereby incorporated herein by reference.

BACKGROUND OF THE INVENTION

1. Field of the Invention

The present invention generally relates to a disk device. More specifically, the present invention relates to a disk device having a cam mechanism for lifting a traverse chassis.

2. Background Information

With a conventional disk device, one end of a traverse chassis is supported by a stationary-side frame (loader chassis). The traverse chassis is capable of inclined movement (up-and-down movement) along a linear path, in which a support position of the stationary-side frame serves as the fulcrum. Also, in addition to an optical pickup and other such optical elements, a turntable is installed on the traverse chassis. When the traverse chassis moves along with the turntable, a disk that has been placed on the turntable is clamped by a joint action of the turntable and a damper that is attached to the stationary-side frame and waits at a specific location. The disk clamped by the damper and the turntable rotates along with the turntable. During the rotation, the disk is optically processed by the optical pickup (see Japanese Laid-Open Patent Application Publication No. 2007-172787, for example).

When an off-center disk is subjected to optical processing, the offset in the center of gravity of the disk rotating along with the turntable causes self-induced vibration. The self-induced vibration can decrease the positional stability of the traverse chassis on which the optical pickup is mounted. In view of this, a variety of measures has been adopted in the conventional disk devices to improve the positional stability of the traverse chassis.

One such measure is to divide the traverse chassis into a chassis main body and an auxiliary member (lever shift) that is shorter in a longitudinal direction than the chassis main body. The chassis main body is made from sheet metal, which increases the weight of the traverse chassis. Furthermore, a rear end part of the chassis main body (corresponds to one end of the traverse chassis) is supported on the stationary-side frame via a first cushioning member that has a damping action. The auxiliary member, which is made from plastic, is linked to the chassis main body via a second cushioning member. The effect of employing this measure is that the weight of the traverse chassis is increased over that when the traverse chassis is made from plastic. Thus, the traverse chassis is less likely to vibrate, and the positional stability of the traverse chassis is increased. Also, the first cushioning member is interposed at the place where the stationary-side frame is linked to the rear end part of the chassis main body of the traverse chassis, and the second cushioning member is interposed at the place where the auxiliary member is linked to the chassis main body. Thus, the damping actions of the first and second cushioning members will help improve the positional stability of the traverse chassis.

Another measure is to modify the configuration of a cam mechanism for tilting (reciprocally moving) the other end of the traverse chassis along the linear path by using the support position of the stationary-side frame as a fulcrum.

The cam mechanism has a follower, a cam plate, a cam groove and an auxiliary guide member. The follower is provided to the auxiliary member. The cam plate is moved leftward and rightward in a direction perpendicular to a direction of the up-and-down movement of the other end of the traverse chassis. The cam groove is provided to the cam plate. The follower slides in the cam groove to move the other end of the traverse chassis (the front end part of the auxiliary member) in the direction of the up-and-down movement along the linear path. The auxiliary guide member slides the follower when the cam plate moves leftward and rightward and has a straight guide face that guides the up-and-down movement of the follower. The cam groove of the cam plate is equipped with a first ride face on which the follower rides up at a limit of the rightward movement, a second ride face on which the follower rides up at a limit of the leftward movement, and an inclined face that connects the first and second ride faces.

With the conventional disk device having the cam mechanism, when the damper and the turntable installed on the traverse chassis jointly clamp the disk, the follower that has ridden up onto the first ride face of the cam groove is located within the cam groove and is guided by the guide face. Furthermore, the pressing action in a leftward direction of a plastic spring provided to the auxiliary guide member causes the follower to be pressed elastically at a right angle in the leftward direction against the guide face of the auxiliary guide member. Accordingly, the follower and the other end of the traverse chassis equipped with the follower are positioned in the leftward and rightward directions of the traverse chassis.

With the cam mechanism, in order to minimize the decrease in the positional stability of the traverse chassis by the self-induced vibration attributable to deviation in the center of the gravity of the disk, it is preferable for the follower of the cam mechanism that has ridden up onto the first ride face of the cam groove to be flanked by the cam groove and the guide face, and to be accurately positioned in the mutually perpendicular directions.

However, there is a gap attributable to production error, or a gap that is essential in terms of permitting smooth movement of the follower, or another such gap between the cam groove and the follower of the cam mechanism that has ridden up onto the first ride face of the cam groove. Thus, even though the follower is elastically pressed by the plastic spring against the guide face, the follower is not positioned accurately and without any looseness in the direction of the up-and-down movement of the traverse chassis. Accordingly, with the cam mechanism, the self-induced vibration during the disk rotation is transmitted to the follower, and the follower vibrates. As a result, optical read error tends to occur in the optical pickup, which causes image distortion, sound jump, and the like.

This problem is especially apt to occur when playing a disk whose center of gravity is off-center. Also, there is the risk that the guide face of the auxiliary guide member, the first ride face of the inclined face will be deformed by heat generated by the vibration of the follower, which would make optical read errors more likely to occur. This is much more likely to happen under a high-temperature environment (a temperature of 65° C. and a humidity of 80%), or after high-temperature storage (storage for 120 hours at a temperature of 65° C. and a humidity of 80%).

In view of the above, it will be apparent to those skilled in the art from this disclosure that there exists a need for an improved disk device. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a disk device in which a traverse chassis is stationary positioned.

In accordance with one aspect of the present invention, a disk device includes a loader chassis, a traverse chassis, an optical pickup, a clamp mechanism and a cam mechanism. The traverse chassis is pivotable with respect to the loader chassis between a loading position and an unloading position. The optical pickup is slidably mounted on the traverse chassis. The clamp mechanism has a damper attached to the loader chassis and a turntable rotatably mounted on the traverse chassis. The clamp mechanism clamps a disk placed on the turntable between the damper and the turntable when the traverse chassis is located at the loading position. The cam mechanism is arranged to pivot the traverse chassis with respect to the loader chassis between the loading position and the unloading position. The cam mechanism includes a follower, a cam plate, a guide member and a biasing member. The follower protrudes from a front end portion of the traverse chassis. The cam plate has a cam groove. The cam plate is slidably arranged in a transverse direction of the traverse chassis with respect to the traverse chassis. The cam plate receives the follower in the cam groove and has a first restricting face that restricts a first direction movement of the follower with respect to the cam plate in a first direction of the traverse chassis when the traverse chassis is located at the loading position. The guide member is fixedly attached to the loader chassis and is arranged to guide the follower along the first direction of the traverse chassis. The guide member has a second restricting face that restricts a second direction movement of the follower with respect to the guide member in a second direction of the traverse chassis when the traverse chassis is located at the loading position. The second direction of the traverse chassis is perpendicular to the first direction of the traverse chassis. The biasing member biases the follower towards both the first restricting face of the cam plate and the second restricting face of the guide member when the traverse chassis is located at the loading position.

With the disk device of the present invention, it is possible to provide a disk device in which a traverse chassis is stationary positioned.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention is provided for illustration only and not for the purpose of limiting the invention as defined by the appended claims and their equivalents.

Figure 1:
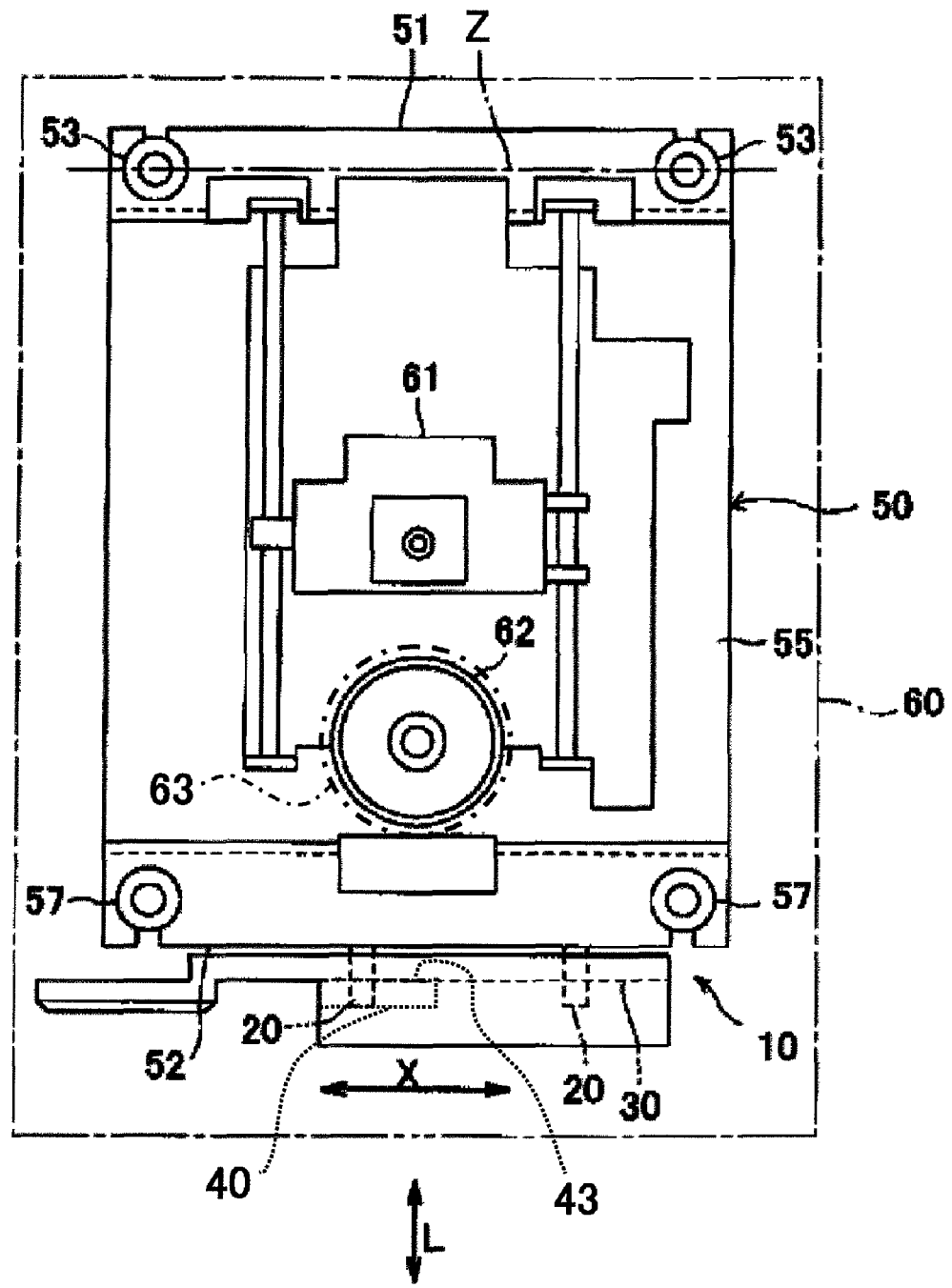
FIG. 1 is a top plan view of a disk device in accordance with one embodiment of the present invention.

As shown in FIG. 1, a disk device includes a cam mechanism 10, a traverse chassis 50, a stationary-side frame (e.g., loader chassis) 60, an optical pickup 61, a turntable 62, a damper 63, a spindle motor (not shown) and a disk tray (not shown). The disk device is an optical disk device, such as a DVD recorder, a DVD player, a BD recorder, a BD player, or the like.

The stationary-side frame 60 serves as a loader chassis. The stationary-side frame 60 is formed in a rectangular shape. The disk tray moves in and out between a retracted position and an ejected position with respect to the stationary-side frame 60 in a longitudinal direction of the stationary-side frame 60 indicated by the arrow L.

The optical pickup 61 includes optical elements, such as an objective lens. The optical pickup 61 is slidably mounted on the traverse chassis 50. Furthermore, the turntable 62 and the spindle motor for rotating the turntable 62 are mounted on the traverse chassis 50. The damper 63 is attached to the stationary-side frame 60. The traverse chassis 50 is pivotally attached to the stationary-side frame 60 between a loading position and an unloading position. The turntable 62 and the damper 63 forms a clamping mechanism that clamps a disk placed on the turntable 62 between the damper 63 and the turntable 62 when the traverse chassis 50 is located at the loading position. One end portion 51 of the traverse chassis 50 in a lengthwise direction of the traverse chassis 50 indicated by the arrow L is loosely attached to the stationary-side frame 60. The other end (e.g., free end) 52 in the lengthwise direction on the opposite side is free to angle up and down with respect to the stationary-side frame 60. Specifically, the other end portion 52 is inclined up and down by using attachment locations of the one end portion 51 as a fulcrum. First cushioning members (e.g., first cushioning elements) 53 are provided at two attachment locations on the left and right to the one end portion 51 of the traverse chassis 50. The first cushioning members 53 absorb vibration of the traverse chassis 50 and the stationary-side frame 60. The first cushioning members 53 are made of anti-vibration rubber. Also, the other end portion 52 of the traverse chassis 50 is pivotable around a one-dot chain line (e.g., an axis) Z with respect to the stationary-side frame 60 upward and downward (angled movement) in an up-and-down direction along a linear path by using the attachment locations (e.g., support position) as the fulcrum through deformation of the first cushioning members 53. Specifically, the other end portion 52 of the traverse chassis 50 is pivotable around the one-dot chain line Z that extends in the transverse direction of the transverse chassis 50 through locations where the first cushioning members 53 are disposed. The stationary-side frame 60 and the one end portion 51 of the traverse chassis 50 are fastened by attachment screws (not shown) via the first cushioning members 53. Therefore, the first cushioning members 53 and the attachment screws form a support mechanism that supports the one end portion 51 of the traverse chassis 50 on the stationary-side frame 60.

Figure 2:
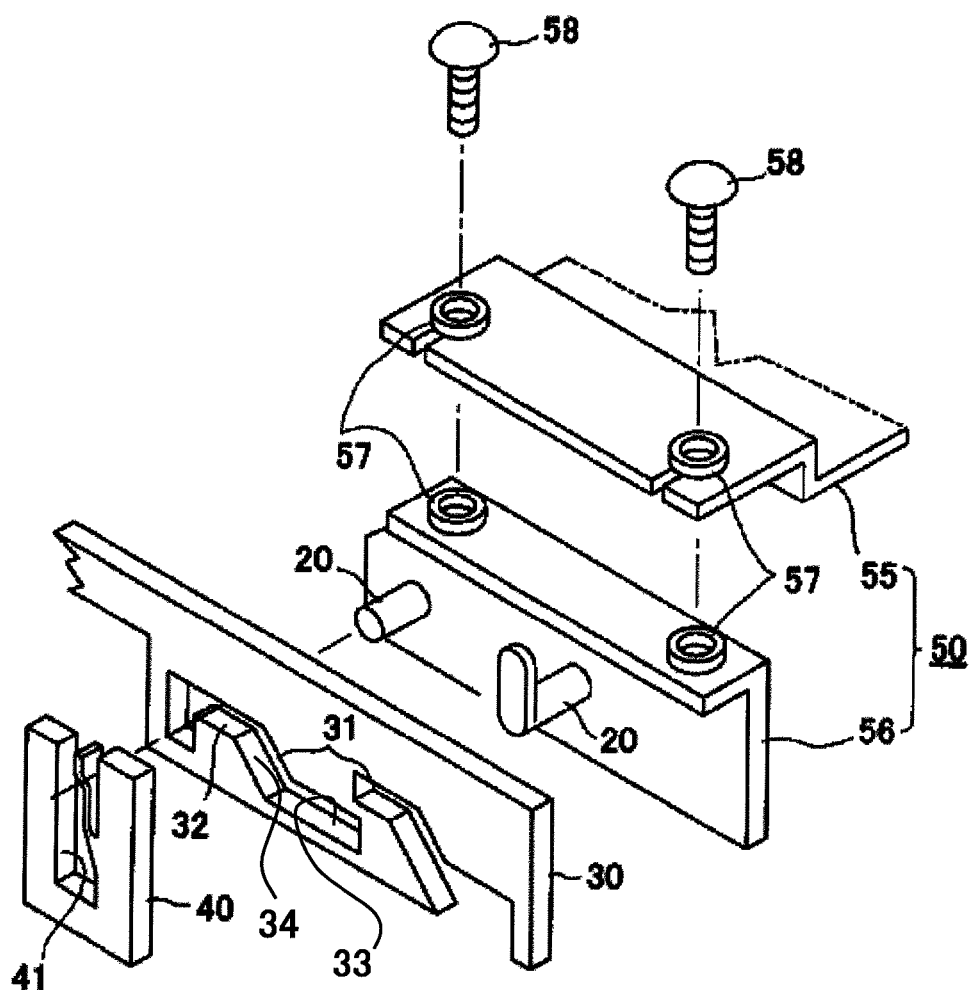
FIG. 2 is a exploded perspective view of a cam mechanism of the disk device illustrated in FIG. 1.

As shown in FIG. 2, the traverse chassis 50 is divided into a chassis main body 55 and an auxiliary member (e.g., auxiliary body) 56. In other words, the traverse chassis 50 includes the chassis main body 55 and the auxiliary member 56. The chassis main body 55 is made of sheet metal. The auxiliary member 56 serves as a lever shift and is made of a plastic molding. The auxiliary member 56 is linked to the chassis main body 55. As shown in FIG. 1, a rear end part (e.g., rear side portion) of the chassis main body 55 (corresponds to the one end portion 51 of the traverse chassis 50) is fastened with attachment screws (not shown) at two attachment locations on the left and right via the first cushioning members 53. As shown in FIG. 2, the chassis main body 55 and the auxiliary member 56 are linked together with attachment screws 58 via second cushioning members (e.g., second cushioning elements) 57. Specifically, a front end part (e.g., front side portion) of the chassis main body is attached to the auxiliary member 56 via the second cushioning members 57. The second cushioning members 57 are made of anti-vibration rubber. The cushioning members 57 elastically supports the front end part of the chassis main body 55 with respect to the auxiliary member 56 of the traverse chassis 50 at two locations space apart in the transverse direction of the traverse chassis 50.

The cam mechanism 10 will now be described through reference to FIGS. 1 and 2. The cam mechanism 10 tilts and reciprocally moves the other end portion 52 of the traverse chassis 50 along the linear path with respect to the stationary-side frame 60 between the loading position and the unloading position. The cam mechanism 10 has left and right followers 20, a cam plate 30, a cam groove 31 and an auxiliary guide member (e.g., guide member) 40. The left and right followers 20 have left and right cylindrical protrusions provided at two locations on the left and right of a front end part (e.g., front end portion) of the auxiliary member 56 (corresponds to the other end portion 52 of the traverse chassis 50). The left and right followers 20 are integrally formed with the auxiliary member 56 as a one-piece, unitary member. The cam groove 31 is provided to the cam plate 30. The cam groove 31 of the cam plate 30 has a first ride face (e.g., first restricting face) 32, a second ride face 33 and an inclined face 34. The first and second ride faces 32 and 33 extend horizontally. The left follower 20 slides in the cam groove 31 and rides up on the first ride face 32 when the cam plate 30 moves rightward and reaches at a limit of the rightward movement of the cam plate 30. In other words, the left follower 20 rides up on the first ride face 32 when the traverse chassis 50 is lifted up with respect to the stationary-side frame 60 and is located at the loading position. Furthermore, the first ride face 32 restricts downward movement (e.g., first direction movement) of the follower 20 with respect to the cam plate 30 in a downward direction (e.g., first direction) along the up-and-down direction of the traverse chassis 50 when the traverse chassis 50 is located at the loading position. The left follower 20 also rides up on the second ride face 33 when the cam plate 30 moves leftward and reaches at a limit of the leftward movement of the cam plate 30. In other words, the left follower 20 rides up on the second ride face 33 when the traverse chassis 50 is lifted down with respect to the stationary-side frame 60 and is located at the unloading position. The inclined face 34 connects the first and second ride faces 32 and 33. The cam plate 30 is designed to reciprocally move leftward and rightward in a transverse direction indicated by the arrow X in FIG. 1. The transverse direction is perpendicular to the up-and-down direction of reciprocal movement of the other end portion 52 of the traverse chassis 50.

Thu auxiliary guide member 40 is fixedly attached to the stationary-side frame 60 and guides the follower 20 along the up-and-down direction. The auxiliary guide member 40 includes left and right guide faces 41 facing each other with a gap therebetween. The left and right guide faces 41 slide the left follower 20 when the cam plate 30 moves in the transverse direction to guide the left follower 20 in the up-and-down direction. Specifically, the left guide face (e.g., second restricting face) 41 restricts a leftward movement (e.g., second direction movement) of the follower 20 with respect to the guide member 40 in a leftward direction (e.g., second direction) of the traverse chassis 50 when the traverse chassis 50 is located at the loading position. The front end part of the auxiliary member 56 corresponds to the other end portion 52 of the traverse chassis 50. Furthermore, the auxiliary guide member 40 has a slide face 43 that guides the leftward and rightward movement of the cam plate 30. The auxiliary guide member 40 is integrally formed from plastic with the stationary-side frame 60 that is made of a plastic molding as a one-piece, unitary member.

The stationary-side frame 60 further includes the damper 63 rotatably attached to the stationary-side frame 60. The damper 63 is designed to clamp the disk placed on the turntable 62 along with the turntable 62. The design allows the disk clamped between the damper 63 and the turntable 62 to rotate along with the turntable 62, and during the rotation the disk is optically processed by the optical pickup 61. Specifically, the damper 63 works in conjunction with the turntable 62 to clamp the disk when the other end portion 52 of the traverse chassis 50 is moved up by the cam mechanism 10 with respect to the stationary-side frame 60.

Figure 3:
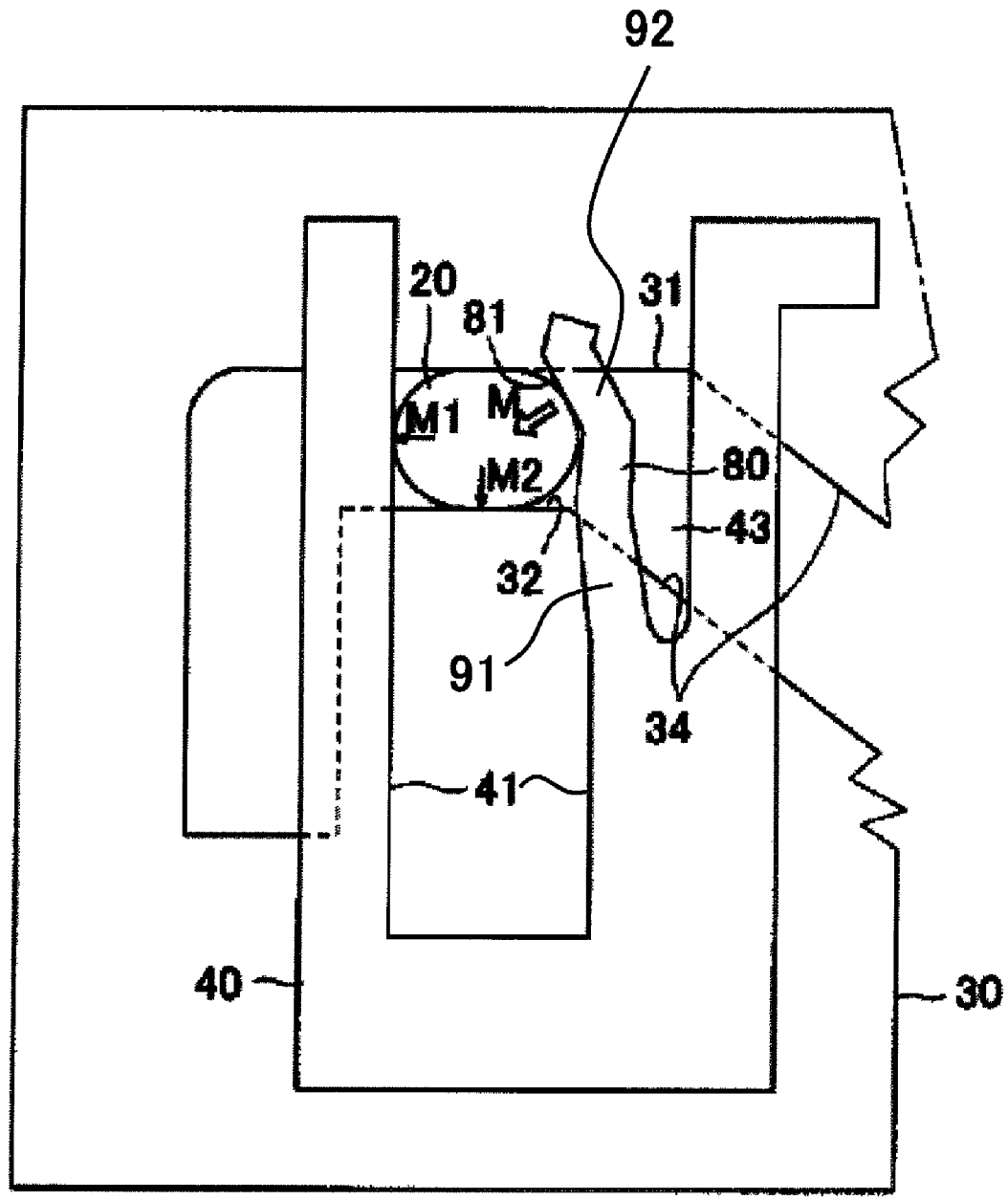
FIG. 3 is a detail side view of the cam mechanism of the disk device illustrated in FIG. 1.

When the disk is clamped through the joint action of the damper 63 and the turntable 62, as show in FIG. 3, the left follower 20 of the cam mechanism 10 that has ridden up onto the first ride face 32 of the cam groove 31 is flanked by the left and right guide faces 41 within the cam groove 31. Specifically, the left follower 20 of the cam mechanism 10 that has ridden up onto the first ride face 32 of the cam groove 31 is located opposite the left guide face 41, which is perpendicular to the first ride face 32. Therefore, the left and right followers 20 and the other end portion 52 of the traverse chassis 50 are positioned in the up-and-down direction of the traverse chassis 50, and in the transverse direction of the traverse chassis 50.

However, there is a gap attributable to production error, or a gap that is essential in terms of permitting smooth movement of the left follower 20, or another such gap between the left and right guide faces 41 and the left follower 20 that has ridden up onto the first ride face 32 of the cam groove 31, and between the left follower 20 and the cam groove 31.

In view of this, the cam mechanism 10 further includes a pressing means (e.g., biasing member) for elastically biasing and pressing the left follower 20 that has ridden up onto the first ride face 32 of the cam groove 31 towards the first ride face 32 and the left guide face 41 of the auxiliary guide member 40. The pressing means has a spring body 80. The spring body 80 is made of a plastic spring that is formed from plastic. The spring body 80 is integrally formed with the auxiliary guide member 40 as a one-piece, unitary member. The spring body 80 is produced by providing the auxiliary guide member 40 with a cut-out 43 along the right guide face 41 of the plastic auxiliary guide member 40. More specifically, as shown in FIG. 3, the spring body 80 is formed at a location where it elastically presses on the left follower 20 that has ridden up onto the first ride face 32 of the cam groove 31.

The spring body 80 has a base portion 91 and an inclined portion (e.g., slanted end portion) 92. The base portion 91 extends from the right guide face 41 inward and upward along the cut-out 43. The inclined portion 92 extends from a distal end of the base portion 91 inward and upward towards the left guide face 41. The inclined portion 92 extends in a direction intersecting with a lengthwise direction of the base portion 91. The inclined portion 92 is slanted with respect to the left guide face 41 of the auxiliary guide member 40. The inclined portion 92 has an inclined face 81 on the left side thereof. The spring body 80 is formed at a location facing the left guide face 41 of the auxiliary guide member 40.

The inclined face 81 presses on one location (e.g., one place) of an outer peripheral face of the left follower 20 that has ridden up onto the first ride face 32 of the cam groove 31. Specifically, the inclined face 81 presses the left follower 20 in a direction (e.g., third direction) that is inclined as indicated by the arrow M with respect to both the left guide face 41 and the first ride face 32. In other words, the inclined portion 92 presses the one location of the outer peripheral face of the follower 20 when the traverse chassis 50 is located at the loading position. The one location of the outer peripheral face of the left follower 20 is located at a location upward with respect to a vertical center of the left follower 20 and rightward with respect to a horizontal center of the left follower 20. Accordingly, the left follower 20 that has ridden up onto the first ride face 32 of the cam groove 31 is elastically pressed as indicated by the arrows M1 and M2 against both the first ride face 32 and the left guide face 41 by the elastic pressing action of the spring body 80. Thus, the left follower 20 is positioned accurately and without any looseness in two mutually perpendicular directions. As a result, if the disk should undergo self-induced vibration during disk rotation, there will be no risk that the left follower 20 will vibrate, nor will there be any risk that the positional stability of the traverse chassis 50 will be lost. Furthermore, the second cushioning members 57 are interposed at the locations where the chassis main body 55 and the auxiliary member 56 are linked. Thus, a situation in which the left and right followers 20 are less likely to vibrate is more pronounced. Therefore, this solves the problem of optical read error being prone to occurring in the optical pickup 61 when the disk undergoes self-induced vibration during rotation. In particular, even when the disk whose center of gravity is off-center is handled, image distortion, sound jump, and other such problems are less likely to be encountered. Also, there is no risk that optical read error will occur due to deformation of the first ride face 32 of the cam groove 31, the left and right guide faces 41 of the auxiliary guide member 40, or the like caused by heat generated by vibration of the left follower 20 accompanying self-induced vibration of the disk.

With the cam mechanism 10, the left follower 20 is positioned accurately and without any looseness in two mutually perpendicular directions. However, it is also possible for both of the left and right followers 20 to be positioned accurately and without any looseness in two mutually perpendicular directions by providing two auxiliary guide members 40 at locations corresponding to the left and right followers 20.

With the disk device, the auxiliary guide member 40 has the slide face 43 that guides the leftward and rightward movement of the cam plate 30. However, the stationary-side frame 60 can includes a slide face that guides the leftward and rightward movement of the cam plate 30 at a location other than the auxiliary guide member 40.

With the disk device, the chassis main body 55 is made from sheet metal. Thus, the traverse chassis 50 weighs more and is less prone to vibrating. Also, the chassis main body 55 of the traverse chassis 50 is supported on the stationary-side frame 60 via the first cushioning members 53, and the auxiliary member 56 of the traverse chassis 50 is linked to the chassis main body 55 via the second cushioning members 57. Thus, self-induced vibration of the disk is absorbed by the first and second cushioning members 53 and 57, and vibration of the traverse chassis 50 is damped. In particular, the damping action of the second cushioning members 56 reduces the transmission of self-induced disk vibration to the left follower 20 of the cam mechanism 10 that has ridden up onto the first ride face 32 of the cam mechanism 10. Furthermore, the left follower 20 is elastically pressed against both the first ride face 32 and the left guide face 41 of the auxiliary guide member 40. Thus, the left follower 20 is positioned accurately and without any looseness in two mutually perpendicular directions. As a result, the positional stability of the traverse chassis 50 is improved. Accordingly, this solves the problem of optical read error being prone to occurring in the optical pickup 61 when the disk vibrates during rotation, and makes it possible to provide the disk device with which image distortion, sound jump, and other such problems are less likely to be encountered.

With the disk device, the rear end part of the chassis main body 55 is supported on the stationary-side frame 60 via the first cushioning members 53, and the auxiliary member 56 is linked to the chassis main body 55 at two places on the left and right via the second cushioning members 57.

With the disk device, the pressing means has the spring body 80 that presses on one place around the outer peripheral face of the left follower 20 in a direction that is slanted with respect to both the first ride face 32 and the left guide face 41. Furthermore, the spring body 80 is integrally formed from plastic along with the auxiliary guide member 40. Thus, there is no need for an extra part to be added as the spring body 80.

With the disk device, the auxiliary guide member 40 is integrally formed from plastic on the stationary-side frame 60 that is made of a plastic molding having the slide face 43 that guides the leftward and rightward movement of the cam plate 30.

As described above, with the disk device, even if a rotating disk should undergo self-induced vibration while clamped between the turntable 62 and the damper 63, the left and right followers 20 does not vibrate as much. Thus, optical read errors are less likely to occur in the optical pickup 61. Furthermore, vibration of the left and right followers 20 produced by the self-induced vibration of the traverse chassis 50 is suppressed. Thus, the optical read errors are less likely to occur in the optical pickup 61 without entailing any additional parts.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk device equipped with the present invention. Accordingly, these terms, as utilized to describe the present invention should be interpreted relative to a disk device equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A disk device comprising:
a loader chassis;
a traverse chassis pivotable with respect to the loader chassis between a loading position and an unloading position;
an optical pickup slidably mounted on the traverse chassis;
a clamp mechanism having a damper attached to the loader chassis and a turntable rotatably mounted on the traverse chassis, the clamp mechanism clamping a disk placed on the turntable between the damper and the turntable when the traverse chassis is located at the loading position; and
a cam mechanism arranged to pivot the traverse chassis with respect to the loader chassis between the loading position and the unloading position, the cam mechanism including
a follower protruding from a front end portion of the traverse chassis,
a cam plate with a cam groove slidably arranged in a transverse direction of the traverse chassis with respect to the traverse chassis, the cam plate receiving the follower in the cam groove and having a first restricting face that restricts a first direction movement of the follower with respect to the cam plate in a first direction of the traverse chassis when the traverse chassis is located at the loading position,
a guide member fixedly attached to the loader chassis and arranged to guide the follower along the first direction of the traverse chassis, the guide member having a second restricting face that restricts a second direction movement of the follower with respect to the guide member in a second direction of the traverse chassis when the traverse chassis is located at the loading position with the second direction of the traverse chassis being perpendicular to the first direction of the traverse chassis, and
a biasing member biasing the follower towards both the first restricting face of the cam plate and the second restricting face of the guide member when the traverse chassis is located at the loading position.

2. The disk device according to claim 1, wherein
the traverse chassis has a chassis main body being made of sheet metal and an auxiliary body being made of plastic, with a rear side portion of the chassis main body being attached to the loader chassis with a first cushioning member being disposed therebetween, the auxiliary body being attached to a front side portion of the chassis main body with a second cushioning member being disposed therebetween.

3. The disk device according to claim 2, wherein
the follower of the cam mechanism and the auxiliary body of the traverse chassis are integrally formed as a one-piece, unitary member.

4. The disk device according to claim 3, wherein
the traverse chassis pivots about an axis that extends in the transverse direction of the traverse chassis through a location where the first cushioning member is disposed.

5. The disk device according to claim 2, wherein
the first cushioning member includes a pair of first cushioning elements that elastically supports the rear side portion of the chassis main body with respect to the loader chassis at two locations spaced apart in the transverse direction of the traverse chassis, and
the second cushioning member includes a pair of second cushioning elements that elastically supports the front side portion of the chassis main body with respect to the auxiliary body of the traverse chassis at two locations space apart in the transverse direction of the traverse chassis.

6. The device according to claim 5, wherein
the biasing member of the cam mechanism includes a spring body that presses on one place of an outer peripheral face of the follower in a third direction that intersects with the first and second directions of the traverse chassis when the traverse chassis is located at the loading position.

7. The disk device according to claim 6, wherein
the spring body of the biasing member of the cam mechanism is integrally formed from plastic with the guide member of the cam mechanism as a one-piece, unitary member.

8. The device according to claim 1, wherein
the biasing member of the cam mechanism includes a spring body that presses on one place of an outer peripheral face of the follower in a third direction that intersects with the first and second directions of the traverse chassis when the traverse chassis is located at the loading position.

9. The disk device according to claim 8, wherein
the spring body of the biasing member of the cam mechanism is integrally formed from plastic with the guide member of the cam mechanism as a one-piece, unitary member.

10. The disk device according to claim 9, wherein
the spring body of the biasing member of the cam mechanism further includes a slanted end portion that is slanted with respect to the second restricting face of the guide member and presses the one place of the outer peripheral face of the follower in the third direction when the traverse chassis is located at the loading position.

11. The disk device according to claim 1, wherein
the guide member of the cam mechanism is integrally formed from plastic with the loader chassis as a one-piece, unitary member.

12. The disk device according to claim 11, wherein
the loader chassis further includes a slide face that guides the cam plate of the cam mechanism in the transverse direction of the traverse chassis.

13. The disk device according to claim 12, wherein
the biasing member of the cam mechanism is integrally formed with the guide member of the cam mechanism at a location facing the second restricting face of the guide member of the cam mechanism.

* * * * *